(12) United States Patent
Shen

(10) Patent No.: US 6,814,099 B2
(45) Date of Patent: Nov. 9, 2004

(54) FLOW REGULATOR FOR WATER PUMP

(76) Inventor: Der-Fan Shen, 5F, No. 40, Fentzu Wei Chieh, Shan-Chung-City, Taipei Hsien (TW)

(*) Notice: Subject to any disclaimer, the term of this patent is extended or adjusted under 35 U.S.C. 154(b) by 188 days.

(21) Appl. No.: 10/194,080

(22) Filed: Jul. 11, 2002

(65) Prior Publication Data
US 2003/0019526 A1 Jan. 30, 2003

Related U.S. Application Data

(63) Continuation-in-part of application No. 09/912,464, filed on Jul. 24, 2001, now Pat. No. 6,564,826.

(51) Int. Cl.⁷ .............................................. G05D 16/10
(52) U.S. Cl. ........................... 137/505.18; 137/565.13; 417/295
(58) Field of Search ....................... 137/505.18, 505.29, 137/494, 492.5, 565.13; 417/295

(56) References Cited

U.S. PATENT DOCUMENTS

| | | | | |
|---|---|---|---|---|
| 219,114 A | * | 9/1879 | Ross | ..................... 137/505.18 |
| 1,294,151 A | * | 2/1919 | Page | .......................... 137/271 |
| 2,402,499 A | * | 6/1946 | Lawrence | .................... 417/306 |
| 2,701,704 A | * | 2/1955 | Lawrence | ..................... 251/25 |
| 6,564,826 B2 | * | 5/2003 | Shen | ..................... 137/505.18 |

* cited by examiner

Primary Examiner—Stephen M. Hepperle
(74) Attorney, Agent, or Firm—Pro-Techtor International Services

(57) ABSTRACT

A flow regulator for a water pump, comprising a valve body, a left piston, a right piston, a connecting rod, a spring, and a conduit. The valve body is roughly shaped like a cross, having a passageway in a vertical direction and a left tube and a right tube in a horizontal direction, respectively enclosing a left chamber and a right chamber. The left and right pistons are glidingly movable inside the left and right tubes, respectively, being connected by the connecting rod. The spring is inserted between the right piston and a right cap on the right tube. The conduit is placed inside a side wall of the left tube, transmitting water pressure from the passageway to the left chamber. The control element is by water pressure pushed towards the passageway, narrowing the passageway. This is countered by an elastic force of the spring, so that controlled water flow and pressure are achieved.

3 Claims, 5 Drawing Sheets

FLOW REGULATOR FOR WATER PUMP

BACKGROUND OF THE INVENTION

This is a continuation-in-part application of applicant's U.S. patent application Ser. No. 09/912464, filed on Jul. 24, 2001 now U.S. Pat. No. 6,564,826.

1. Field of the Invention

The present invention relates to a flow regulator for a water pump, particularly to a flow regulator for a water pump, which automatically controls water outflow of a water pump for regulating pressure and flow of a water supply system, smoothing start-stop cycles of the water pump.

2. Description of Related Art

The water supply of modem high-rise buildings at times is not sufficient for a steady flow of water or, on the contrary, water pressure is too high, resulting in water splashing out of taps. For this reason, water pumps are often installed, generating a controlled water pressure within a certain range.

Methods for regulating water pressure generated by a water pump with a motor include regulating the speed of the motor and turning the motor on and off to keep the water pressure within a pressure range.

A start-stop system for regulating water pressure mainly comprises a water pump, a pressure-sensitive switch at the outlet of the water pump, and a container. The pressure-sensitive switch senses water pressure at the outlet of the water pump and determines the pressure range. When water pressure falls below a lower threshold, the pressure-sensitive switch turns on the pump, increasing water pressure in the outlet. After water pressure has risen above an upper threshold, the pressure-sensitive switch turns off the pump. The container is installed at the outlet, storing water when the pump is turned on and releasing water when the pump is turned off. Thus water pressure will not change rapidly, and start-stop intervals of the water pump are lengthened.

A speed-regulating system for maintaining constant water pressure has a motor, a pressure sensor and a speed controller, which regulates the speed of the motor according to pressure values read by the pressure sensor. Thus stable water pressure is maintained.

As compared to a speed-regulating system, a conventional start-stop system has a motor with fixed speed which is just regulated by being turned on and off. After turning on the pump, an excess outflow of water resulting in too high a pressure leads to instant turning off of the pump. Start-stop cycles of the pump easily get too short, too much energy is consumed, and the lifetime of the pump is adversely affected. Furthermore, an excess outflow of water will obstruct the pump outlet, increasing pressure therein, as well as load on the pump and energy consumption. Therefore, a start-stop system ideally is used with pumps that deliver about as much water as is needed for the intended water supply, such that turning on the pump lets the water pressure increase only slowly and short start-stop cycles are avoided.

Since the motor of a start-stop system, when turned on, operates at a fixed speed, resulting in a constant delivered quantity of water, but demand in a large building varies with time, the pump has to be sufficiently large. Most of the time, however, demand for water is low, and a large pump is a waste of resources. In addition, pressure generated by a large pump will not be stable.

On the other hand, a speed-regulating system allows quickly to adapt the delivered water quantity to needs, avoiding the shortcoming of start-stop systems. However, the components of a speed-regulating system, a speed-regulated motor and a speed controller, are expensive and need maintenance by qualified personnel. Costs of a speed-regulated system exceed that of a start-stop system and are too large a burden for small buildings. For this reason, speed-regulated systems are generally used only in large buildings.

SUMMARY OF THE INVENTION

It is the main object of the present invention to provide a flow regulator for a water pump, which avoids too short start-stop cycles, saving energy and increasing the lifetime of the water pump.

Another object of the present invention is to provide a flow regulator for a water pump, which allows to regulate water outflow of the water pump to accommodate variations in demand of water, avoiding large mismatches of the outflow of water and demand at peak times.

The present invention can be more fully understood by reference to the following description and accompanying drawings.

DETAILED DESCRIPTION OF THE PREFERRED EMBODIMENTS

Figure 1:
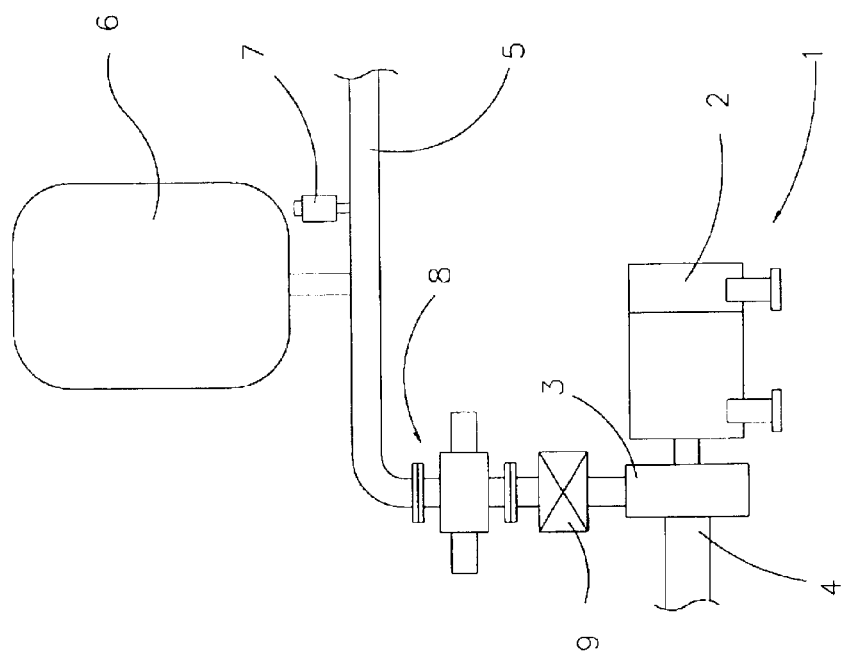
FIG. 1 is a schematic illustration of the flow regulator for a water pump of the present invention in the first embodiment in conjunction with a water pump.

As shown in FIG. 1, the flow regulator for a water pump of the present invention is used in conjunction with a pumping system 1 which comprises: a motor 2; a pump 3, driven by the motor 2; an inlet pipe 4, connecting a water source and an inlet of the pump 3; an supply pipe 5, beginning at an outlet of the pump 3 and delivering water from the pump 3 to a water supply system; a container 6; a pressure-sensitive switch 7; and a backflow-blocking valve 9.

The container 6 is installed at the supply pipe 5. When the pumping system 1 is running, water enters the container 6. After stopping the motor 2, the container 6 feeds water back into the supply pipe 5, so that upon a sudden surge of demand water pressure will not drop rapidly avoiding the need to switch on the motor just after having stopped the movement thereof. The pressure-sensitive switch 7 is mounted on the supply pipe 5, sensing water pressure in the supply pipe 5 and switching on and off the motor 2 of the pumping system 1.

The present invention has a control valve 8 which is installed at the supply pipe 5. Water, having left the pump 3, enters the control valve 8. The main characteristic of the present invention is that the control valve 8 regulates supplied water flow according to water pressure in the supply pipe 5. If, for instance, demand rises rapidly, so that water pressure in the supply pipe 5 drops, the control valve 8 opens wider and water flow delivered by the water pump 3 increases. If, on the other hand, demand decreases, so that water pressure in the supply pipe 5 rises, the control valve 8 restricts water flow. Thus water pressure sensed by the pressure-sensitive valve 7 is smoothed out, and start-stop cycles of the motor 2 are lengthened, resulting in less wear. The backflow-blocking valve 9 is installed at an inlet of the control valve 8, blocking backflow of water from the supply pipe 5.

Figure 2:
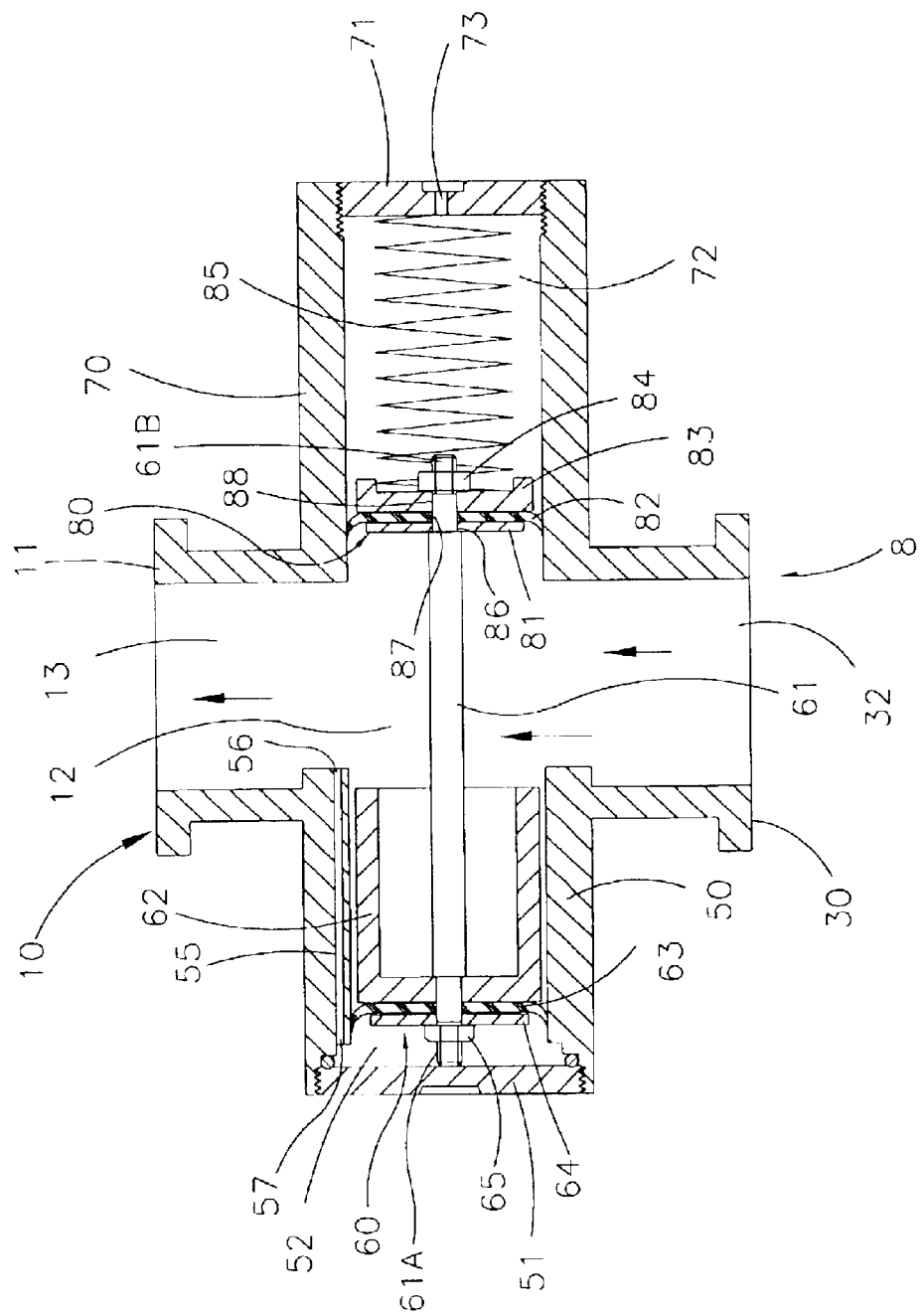
FIG. 2 is a sectional view of the control valve of the present invention in the first embodiment.

Referring to FIG. 2, in a first embodiment of the present invention the control valve 8 has a valve body 10 with an upper tube 11 and a lower tube 30. A passageway 12 connects the upper and lower tubes 11, 30, having a lower end 32 connected with the outlet of the pump 3 and an upper end 13 connected with the supply pipe 5. In a horizontal direction, the valve body 10 has on a left side a left tube 50, accommodating a left piston 60, and on a right side a right tube 70, accommodating a right piston 80. The left piston 60 has an inward extending cylindrical control element 62. A connecting rod 61 connects the left and right pistons 60, 80. A spring 85 is attached to the right of the right piston 80. By the assembly of above mentioned parts, the control element 62 is movable to the left and right, being able to extend into the passageway 12 and controlling water flow through the passageway 12.

The left tube 50 is terminated by a left cap 51, enclosing a left chamber 52, which accommodates the left piston 50. The connecting rod 61 has a left threaded end 61A, over which the control element 62, a sealing ring 63 and a washer 64 are put and fixed by a nut 65. The sealing ring 63 seals the left piston 50 against the left chamber 52 and prevents pressure therein from escaping.

A conduit 55 is cut into a side wall of the left tube 50. The conduit 55 has an inlet 56 at the passageway 12 and an outlet 57 at the left chamber 52, so that water pressure is led from the passageway 12 to the left chamber 52.

The right tube 70 is terminated by a right cap 71, enclosing a right chamber 72. The connecting rod 61 reaches into the right chamber 72 of the right tube 70, having a right threaded end 61B. The right piston 80 has a washer 81 with a central hole 86, a sealing ring 82 with a central hole 88, a base ring 83 with a central hole 87. The sealing ring 82 has a diameter that is slightly larger than the diameters of both the washer 81 and the base ring 83. The washer 81, the sealing ring 82 and the base ring 83 are put on the right threaded end 61B of the connecting rod 61 and fixed by a nut 84. The sealing ring 82 seals the right piston 80 against the right chamber 72.

The spring 85 is disposed to the right of the right piston 80. When water pressure from the passageway 12 is led into the left chamber 52, the left piston 60 is exposed to water pressure, shifting to the right and taking along the right piston 80. Then the right piston 80 is exposed to an elastic force due to the spring 85, shifting to the left and taking along the left piston 60.

For smooth moving of the spring 85 and the right piston 80, a ventilating hole 73 is cut into the right cap 71. In order to adapt to various types of water pumps, the right cap 71 is screwed tight or loosened, increasing or decreasing the elastic force of the spring 85.

When during use of the present invention water pressure in the supply pipe 5 changes, the balanced position of the piston block 314 within the passageway 12 changes accordingly, regulating water flow through the control valve 8 according to demand. Thus pressure of outflowing water in the supply pipe 5 does not exceed a certain range, therefore sudden pressure variations in the supply pipe 5 and frequent switching on and off of the motor 2 are prevented.

Referring again to FIG. 2, the control element 62 undergoes balancing forces from water pressure led through the conduit 55 and from the spring 85. When water pressure in the supply pipe 5 drops, water pressure led through the conduit 55 drops, as well, exerting reduced force on the control element, so that the elastic force of the spring 85 prevails and the control element 62 is pushed to the left. This results in the passageway 12 being opened wider, with higher water flow being furthered by the water pump 3.

Figure 3:
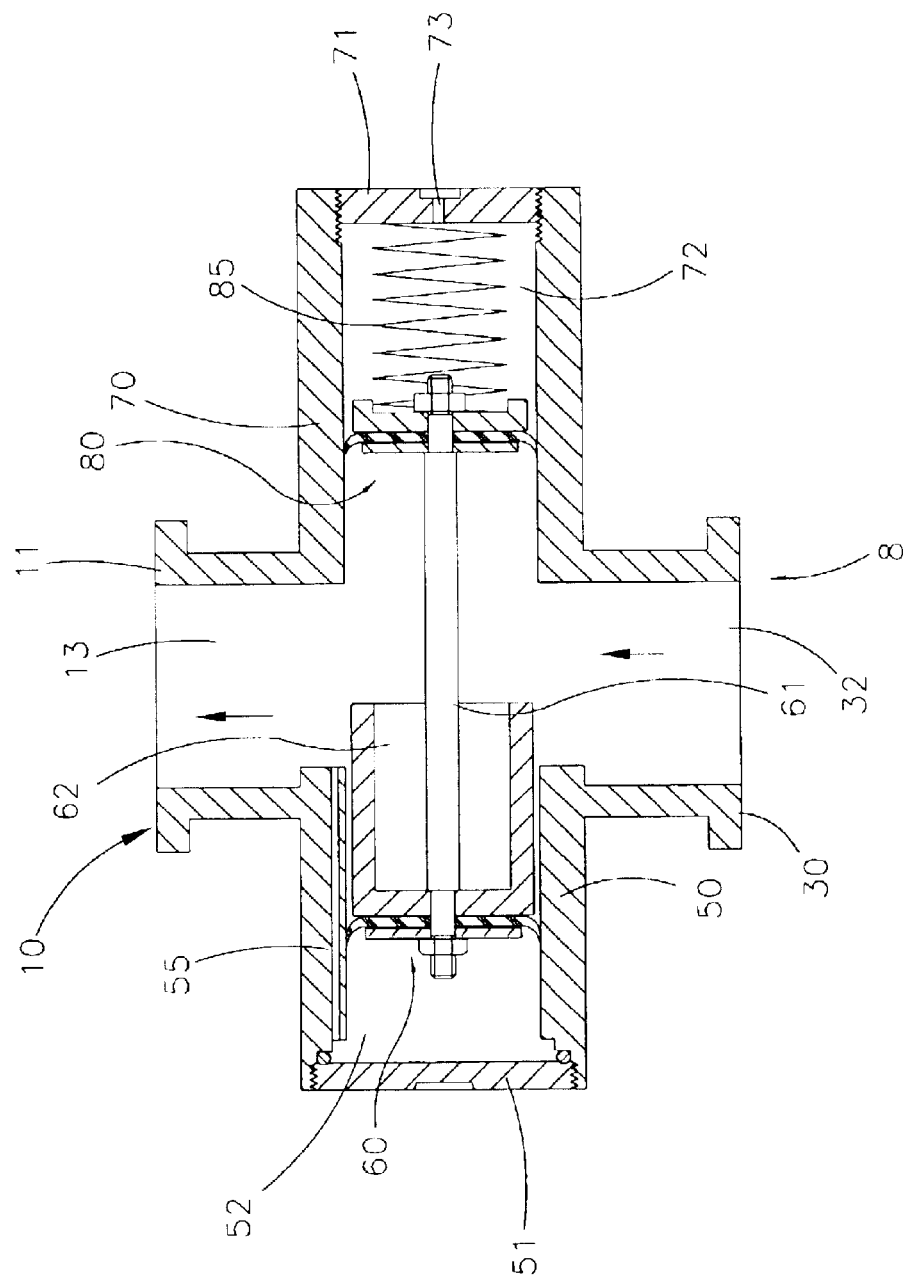
FIG. 3 is a sectional view of the control valve of the present invention in the first embodiment at increased pressure.

When, as shown in FIG. 3, water pressure in the supply pipe 5 rises, water pressure led through the conduit 55 rises, as well, exerting increased force on the control element, overcoming the elastic force of the spring 85, so that the control element 62 is pushed to the right. This results in the passageway 12 being narrowed, with a decreased water flow being furthered by the water pump 3, adapting to reduced demand. Thus the present invention allows quickly to adapt to varying demand, while lengthening start-stop cycles of the motor 2, reducing wear thereof.

Figure 4:
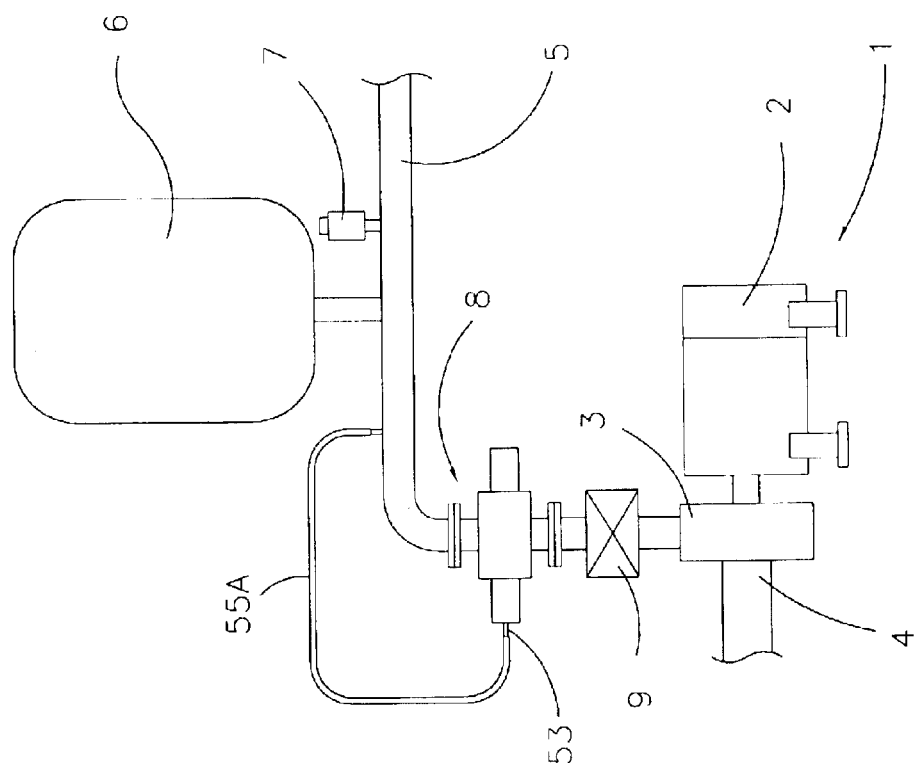
FIG. 4 is a schematic illustration of the flow regulator for a water pump of the present invention in the second embodiment in conjunction with a water pump.
Figure 5:
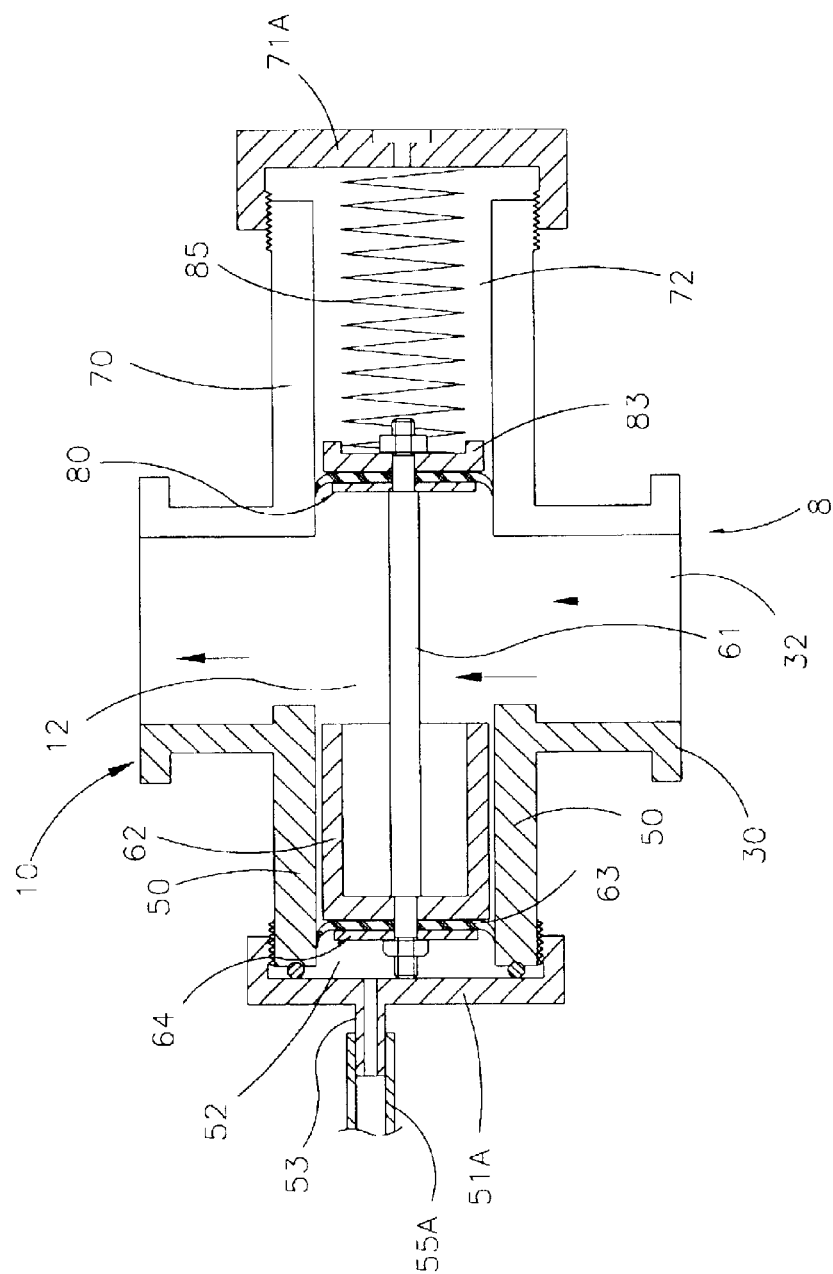
FIG. 5 is a sectional view of the control valve of the present invention in the second embodiment.

Referring to FIGS. 4 and 5, the present invention in a second embodiment has modified left and right caps 51A, 71A and a conduit 55A. The conduit 55A leads from the supply pipe 5 to a connecting tubelet 53 on the left cap 51A. Thus water pressure is led from the supply pipe 5 into the left chamber 51.

While the invention has been described with reference to preferred embodiments thereof, it is to be understood that modifications or variations may be easily made without departing from the spirit of this invention which is defined by the appended claims.

What is claimed is:

1. A flow regulator for a water pump, comprising:
   a valve body having a straight line passageway connecting upper and lower tubes, said valve body further having a left tube directly in line with a right tube, said left and right tubes being terminated by a left cap and a right cap, respectively, enclosing a left chamber and a right chamber;
   a left piston movable in said left tube toward said right tube;
   a right piston movable in said right tube;
   a connecting rod connecting said left and right pistons;
   a spring inserted between a right side of said right piston and said right cap; and a conduit inside a side wall of said left tube, said conduit transmitting water pressure from said passageway to said left chamber;
   wherein said left piston is by water pressure in said conduit pushed into said passageway, narrowing said passageway, this being countered by an elastic force of said spring, so that a constant water flow and pressure are achieved.

2. A flow regulator for a water pump according to claim 1, wherein said conduit connects said left chamber with a water supply pipe.

3. A flow regulator for a water pump according to claim 1, wherein said connecting rod has a threaded right end and said right piston further comprises:
   a washer with a central hole;
   a sealing ring with a central hole;
   a base ring with a central hole, with said sealing ring having a slightly larger diameter than both said washer and said base ring; and
   a nut, fixing said washer, said sealing ring and said base ring on said right threaded end of said connecting rod.

* * * * *